(12) United States Patent
Seger

(10) Patent No.: US 7,963,717 B2
(45) Date of Patent: Jun. 21, 2011

(54) QUICK CHANGE LOCKING COUPLER WITH CONDITION SENSOR

(75) Inventor: Anthony C. Seger, Sidney, OH (US)

(73) Assignee: Tooling Technology, LLC, Ft. Loramie, OH (US)

( * ) Notice: Subject to any disclaimer, the term of this patent is extended or adjusted under 35 U.S.C. 154(b) by 421 days.

(21) Appl. No.: 12/220,756

(22) Filed: Jul. 28, 2008

(65) Prior Publication Data

US 2009/0110477 A1   Apr. 30, 2009

Related U.S. Application Data

(60) Provisional application No. 61/000,183, filed on Oct. 25, 2007.

(51) Int. Cl.
*F16B 21/00* (2006.01)
(52) U.S. Cl. ............ 403/322.2; 403/31; 403/39; 279/50
(58) Field of Classification Search .................. 403/27, 403/31, 34, 35, 36, 37, 39, 322.2, 325; 279/50, 279/122; 425/192 R
See application file for complete search history.

(56) References Cited

U.S. PATENT DOCUMENTS

| 4,573,725 | A  | * | 3/1986 | Griffiths ........................... 403/27 |
| 4,636,135 | A  | * | 1/1987 | Bancon ............................ 403/325 |
| 4,906,123 | A  | * | 3/1990 | Weskamp et al. ........... 403/322.2 |
| 6,110,107 | A  | * | 8/2000 | Bellahsene et al. .............. 403/27 |
| 6,513,802 | B2 |   | 2/2003 | Seger |
| 6,572,356 | B2 |   | 6/2003 | Seger |
| 7,165,961 | B2 |   | 1/2007 | Jachimski |
| 7,258,539 | B2 |   | 8/2007 | Lowe et al. |

* cited by examiner

*Primary Examiner* — Michael P Ferguson
(74) *Attorney, Agent, or Firm* — Jacox, Meckstroth & Jenkins

(57) ABSTRACT

A first tooling component is positively secured to a second tooling component by one or more quick change locking couplers each including a cylinder secured to the first tooling component and having peripherally spaced holes supporting balls for radial movement. A stud is secured to the second tooling component and has an enlarged head portion projecting into the cylinder. A cup-shaped piston surrounds the cylinder and has a recess for receiving the balls in a released position, and a housing supports the piston for axial movement between the released position and a locked position forcing the balls to engage the stud. A compression spring moves the piston to the locked position, and air pressure moves the piston to the released position. A proximity sensor is supported by the housing and detects the piston in the locked position to provide an electrical signal to a remote visual and/or audio indicator.

3 Claims, 1 Drawing Sheet

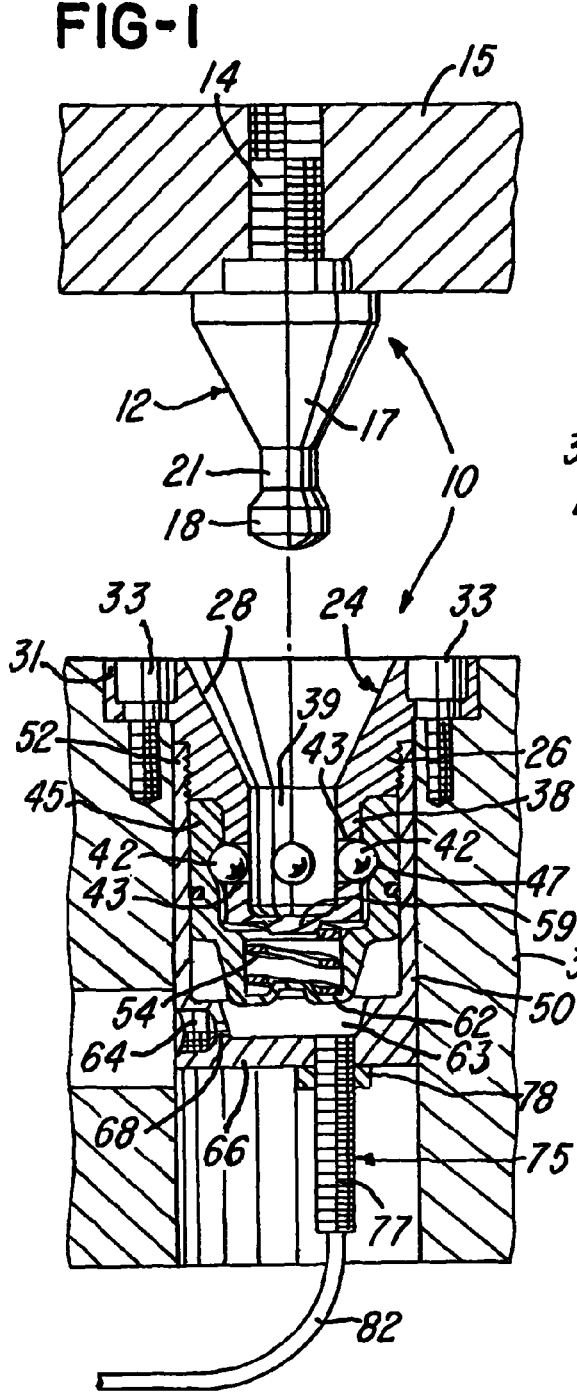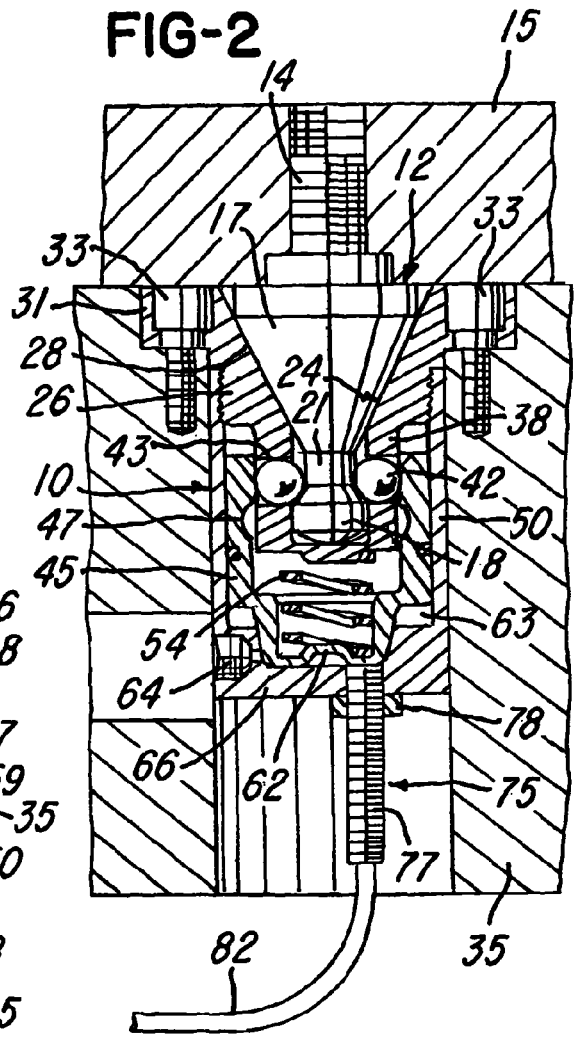

QUICK CHANGE LOCKING COUPLER WITH CONDITION SENSOR

RELATED APPLICATION

This application claims priority of provisional patent application Ser. No. 61/000,183, filed Oct. 25, 2007.

BACKGROUND OF THE INVENTION

The present invention relates to a quick change locking coupler of the type disclosed in U.S. Pat. No. 6,513,802, U.S. Pat. Nos. 6,572,356, 7,165,961 and 7,258,539 which issued to the assignee of the present invention and the disclosures of which are herein incorporated by reference. Such couplers are commonly used for releasably attaching and positively securing a tooling component to a supporting surface, such as, for example, a fixture or thermoforming mold for producing a thermoformed plastic part or an injection mold for producing a molded plastic part. The locking coupler is preferably of the type manufactured and sold by Tooling Technology, LLC of Ft. Loramie, Ohio and referred to in its catalog as a "Quick-Change Cylinder Lock". It has been found desirable to provide such a quick change locking coupler with a form of signal for indicating when the coupler is positively locked after the mold or fixture or other tooling component is in its proper place to assure that the coupler is positively locked and that the tooling component is secured with no chance of the component moving away from its supporting surface. While above-mentioned U.S. Pat. No. 7,258,539 discloses a sensor which detects when two tooling or mold components are brought together, the sensor does not assure that the coupler is in its positively locked condition to prevent any possible damage to either tooling component or mold.

SUMMARY OF THE INVENTION

The present invention is directed to an improved quick change locking coupler which provides the desirable feature mentioned above by mounting on a portion of the coupler a proximity sensor which detects when the coupler is completely and positively locked and then transmits an electrical signal to produce a visual or audio indication showing the locked condition of the coupler. The basic construction of the quick change locking coupler is substantially the same as disclosed in the above-mentioned patents. In addition, the piston housing supports a proximity sensor which senses when the internal piston is in its fully locked position.

BRIEF DESCRIPTION OF THE DRAWINGS

FIG. 1 is an exploded axial section of a quick-change locking coupler constructed in accordance with the invention and showing the tooling components in their retracted unlocked positions; and FIG. 2 is an axial section similar to FIG. 1 and showing the locking coupler in its fully locked position with a proximity sensor detecting the locked condition of the coupler.

DESCRIPTION OF THE ILLUSTRATED EMBODIMENT

A locking coupler 10 includes a male portion in the form of a metal knob or stud 12 having a threaded portion 14 secured to a tooling component 15 such as a thermoforming mold. The stud 12 projects downwardly or outwardly from the tooling component and has a tapered or frusto-conical base portion 17 integrally connected to an enlarged head portion 18 by a cylindrical neck portion 21 of reduced diameter. The coupler 10 also includes a female portion in the form of a cup-shaped cylinder 24 having an annular end portion 26 with an internal tapered surface 28 which mates with the tapered outer surface of the base portion 17 of the stud 12. An end flange portion 31 of the cylinder 24 has circumferentially spaced counterbores which receive machine screws 33 for securing the flange portion 31 within a counterbore 34 within a second tooling component 35 in the form of a metal support plate. The cylinder 24 also has a cup-shaped inner end portion 38 which defines a cavity 39 for receiving the enlarged head portion 18 of the stud 12. A plurality of hardened steel locking balls 42 are retained within corresponding circumferentially spaced holes 43 within the cylinder 24 for corresponding radial movement.

A cup-shaped piston 45 surrounds the portion 38 of the cylinder 24 and has a circumferentially extending internal groove or recess 47 for receiving the balls 42 in retracted positions when the piston 45 is in its released position (FIG. 1). A cylindrical cup-shaped housing 50 surrounds and receives the piston and has an outer end portion 52 secured or threaded onto the annular portion 26 of the cylinder 24. The housing 50 confines and supports the piston 45 for axial sliding movement between a released position (FIG. 1) with the balls 42 retracted into the groove 47 and a locked position (FIG. 2) when the balls 42 are cammed radially inwardly to engage and clamp the head portion 18 of the stud 12. A compression spring 54 extends between an inner end wall 59 of the cylinder 24 and a bottom end wall 62 of the piston 45 and normally urges the piston 45 downwardly or inwardly to the locked position (FIG. 2) of the coupler.

When it is desired to move the piston 45 of the coupler 10 to its released position (FIG. 1), pressurized fluid or air is supplied to a chamber 63 within the coupler housing 50 through a pressurized air line (not shown) connected by a fitting to a threaded port 64 within an inner end wall 66 of the housing 50. A small air passage 68 connects the port 64 to the chamber 63 within the housing. The pressurized air shifts the piston 45 to its released position (FIG. 1) compressing the spring 54. When the air is released, the piston 45 returns to its locked position.

In accordance with the present invention, an electronic proximity detector or sensor 75 has an externally threaded tubular housing 77 which is threaded into a hole within the bottom or end wall 66 of the housing 50 and is secured by a lock nut 78. The inner end of the sensor 75 is flush with the inner bottom surface of the housing 50, and a flexible electrical cable 82, enclosing electrical conductors, extends from the opposite end of the sensor 77 to a remote indicating unit or system in the form of a visual light indication and/or an audio alarm indication. One form of proximity sensor which has provided satisfactory results is produced by Turck Inc. and identified and sold under the Number S4602256.

When it is desired to couple the parts or components 15 and 35 together, compressed fluid or air is supplied through the port 68 to pressurize the chamber 63 below the piston 45 and to move the piston to its released position (FIG. 1). The tooling component 15 is then placed in position adjacent the supporting tooling component 35 with head portion 18 of the stud 12 projecting into the cavity 39. Pressurized air within the chamber 63 is then released, and the spring 54 shifts the piston 45 downwardly or inwardly to its locked position (FIG. 2). If there is no air pressure in the chamber 63 before the components 15 and 35 are brought together, the balls 42 remain in their locked positions, blocking entrance of the head portion 18 of the stud.

When the piston 45 bottoms and seats on the bottom wall 66 of the housing 50, the sensor 75 detects the bottom wall of the piston 45 (FIG. 2) and produces a signal which provides an instantaneous visual or audio indication that the coupler is in its fully locked position. At this point, the operator of the machine equipped with the tooling knows that the tooling is positioned and positively locked before beginning production, thereby preventing dropped tooling or damaged tooling or damaged tooling machinery. The visual or audio indication also provides reliability by providing an indication after every tool change and prior to each production run. In addition, other physical tests which are usually made to assure that the components 15 and 35 are in their precise locked position, are reduced or eliminated, making the overall tool changing more simple, quick and efficient.

While the form of the locking coupler herein described constitutes a preferred embodiment of the invention, it is to be understood that the invention is not limited to this precise form of the locking coupler, and that changes made therein without departing from the scope and spirit of the invention as defined in the appended claims.

What is claimed is:

1. A quick change locking coupler positively securing a first tooling component to a second tooling component, said coupler comprising:

a cylinder having an axis and secured to said first tooling component, said cylinder including a cylindrical portion comprising a wall defining a cavity and having peripherally spaced holes extending through said wall and supporting a plurality of circumferentially spaced balls for corresponding radial movement within said holes, a stud secured to said second tooling component and having an enlarged head portion projecting into said cavity of said cylinder, a cup-shaped piston surrounding said cylinder and having a recess for receiving said balls in a released position of said piston, a compression spring urging said piston axially to a locked position in which said piston engages and retains said balls radially within said holes in said cylinder such that said balls engage said head portion of said stud, a housing supporting said piston for axial movement and having an end wall cooperating with said piston to define a fluid chamber therebetween, said piston being movable axially against said spring to said released position where said balls are received within said recess to release said stud and permit removal of said second tooling component from said first tooling component, a fluid pressure line connected to said fluid chamber within said housing for moving said piston against said spring to said released position in response to fluid pressure within said chamber, a proximity sensor extending axially through said end wall of said housing to said chamber and positioned to detect the position of said piston within said housing, said piston having an end wall adjacent said proximity sensor when said piston is in said locked position, and said sensor providing an electrical signal in response to the position of said piston within said housing.

2. A coupler as defined in claim 1, wherein said sensor includes a threaded tubular member threaded into said end wall of said housing and positioned to detect said piston in said locked position.

3. A coupler as defined in claim 1, wherein said stud has a frusto-conical outer locating surface, said cylinder has a mating frusto-conical inner locating surface engaging said outer surface when said piston is in said locked position, and said proximity sensor includes an externally threaded tubular housing threaded into said end wall of said housing.

* * * * *